US007185834B1

(12) United States Patent
Davidson

(10) Patent No.: US 7,185,834 B1
(45) Date of Patent: Mar. 6, 2007

(54) APPARATUS FOR A MOBILE SUPPORT DEVICE FOR A PRESSURE WASHER WAND

(76) Inventor: Harold D. Davidson, 440 La Veta Dr., Melbourne, FL (US) 32904

( * ) Notice: Subject to any disclaimer, the term of this patent is extended or adjusted under 35 U.S.C. 154(b) by 336 days.

(21) Appl. No.: 10/919,497

(22) Filed: Aug. 17, 2004

(51) Int. Cl.
*B05B 3/00* (2006.01)
*B05B 1/28* (2006.01)
*B05B 7/02* (2006.01)
*A01G 25/09* (2006.01)

(52) U.S. Cl. ...................... 239/722; 239/104; 239/105; 239/146; 239/147; 239/526; 239/532

(58) Field of Classification Search ................ 239/722, 239/146, 147, 526, 532, 104, 105; 417/63, 417/234, 415, 423.1; 134/95.1, 95.3, 172
See application file for complete search history.

(56) References Cited

U.S. PATENT DOCUMENTS

| | | | | |
|---|---|---|---|---|
| 300,772 | A | | 6/1884 | Grisel |
| 352,697 | A | | 9/1886 | Lane |
| 3,508,709 | A | | 4/1970 | Small |
| 4,083,495 | A | | 4/1978 | Sharp |
| 4,703,895 | A | | 11/1987 | Harvey |
| 4,892,251 | A | | 1/1990 | Bresnen |
| 5,259,557 | A | * | 11/1993 | Spriggs et al. .............. 239/304 |
| 5,299,767 | A | | 4/1994 | Simpson |
| 5,816,499 | A | | 10/1998 | Christiansen |
| 5,996,907 | A | * | 12/1999 | Toetschinger et al. ...... 239/305 |
| 6,158,673 | A | * | 12/2000 | Toetschinger et al. ...... 239/305 |
| 6,279,838 | B1 | | 8/2001 | Sivells |
| D462,494 | S | | 9/2002 | Patrizi |

* cited by examiner

*Primary Examiner*—Davis Hwu

(57) ABSTRACT

A mobile pressure washer wand support with a dolly-like wheeled base with a cut out slot for securely holding the pressure washer wand in place. This allows the user to have the weight of the pressure washer hose alleviated to reduce fatigue and backache. The user can place the pressure washer wand in the adjustable wand slot, tighten clamps to hold the wand in place, and simply point it in the direction that is desired to be sprayed.

1 Claim, 4 Drawing Sheets

APPARATUS FOR A MOBILE SUPPORT DEVICE FOR A PRESSURE WASHER WAND

BACKGROUND

1. Field

The present disclosure pertains to apparatuses that are mobile support devices for pressure washer wands.

2. Description of Related Art

The need to easily use and move a pressure washer wand is well known in the art.

Various mobile pressure washer wand supports have been proposed.

For example, the following U.S. Pat. Nos. 4,892,251, 3,508,709, 4,083,495, 6,279,838, 4,703,895, 5,299,767, 5,816,499, Des. 462,494, 300,772, and 352,697 have described apparatuses that are mobile pressure washing wand supports.

However, the preceding mobile pressure washer supports do not support the pressure washing wand, do not alleviate fatigue or allow for one hand application, or provide protection from getting wet feet.

BRIEF DESCRIPTION OF THE FIGURES

The present invention is illustrated by way of example and not limitation in the Figures of the accompanying drawings.

DETAILED DESCRIPTION

The following description provides an apparatus for a mobile pressure washing wand support device. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, various problems exist for prior mobile pressure washer supports. For example, they do not support the pressure washing wand, do not alleviate fatigue or allow for one hand application, or provide protection from getting wet feet. In contrast, in one aspect, the claimed subject matter depicts a mobile pressure washer wand support that comprises of dolly-like wheeled base with a cut out slot for securely holding the pressure washer wand in place. This allows the user to have the weight of the pressure washer hose alleviated to reduce fatigue and backache. For example, in one embodiment, the user can place the pressure washer wand in the adjustable wand slot, tighten clamps to hold the wand in place, and simply point it in the direction that is desired to be sprayed. Because of the weight of the pressure washing wand being held up by the base of the claimed subject matter, a more uniform cleaning is enabled. Likewise, the person using the pressure washer wand support needs only one hand and exhibit little energy to use the pressure washer. Therefore, the claimed subject matter can be utilized by home owners, commercial businesses, young and old alike.

The claimed subject matter also depicts a way to pressure wash without getting one's feet wet. In one embodiment, a rectangular splash shield is connected to the bottom and back side of the mobile support device. The splash shield can comprise of a durable plastic, metal, or another material to deflect water.

Figure 1:
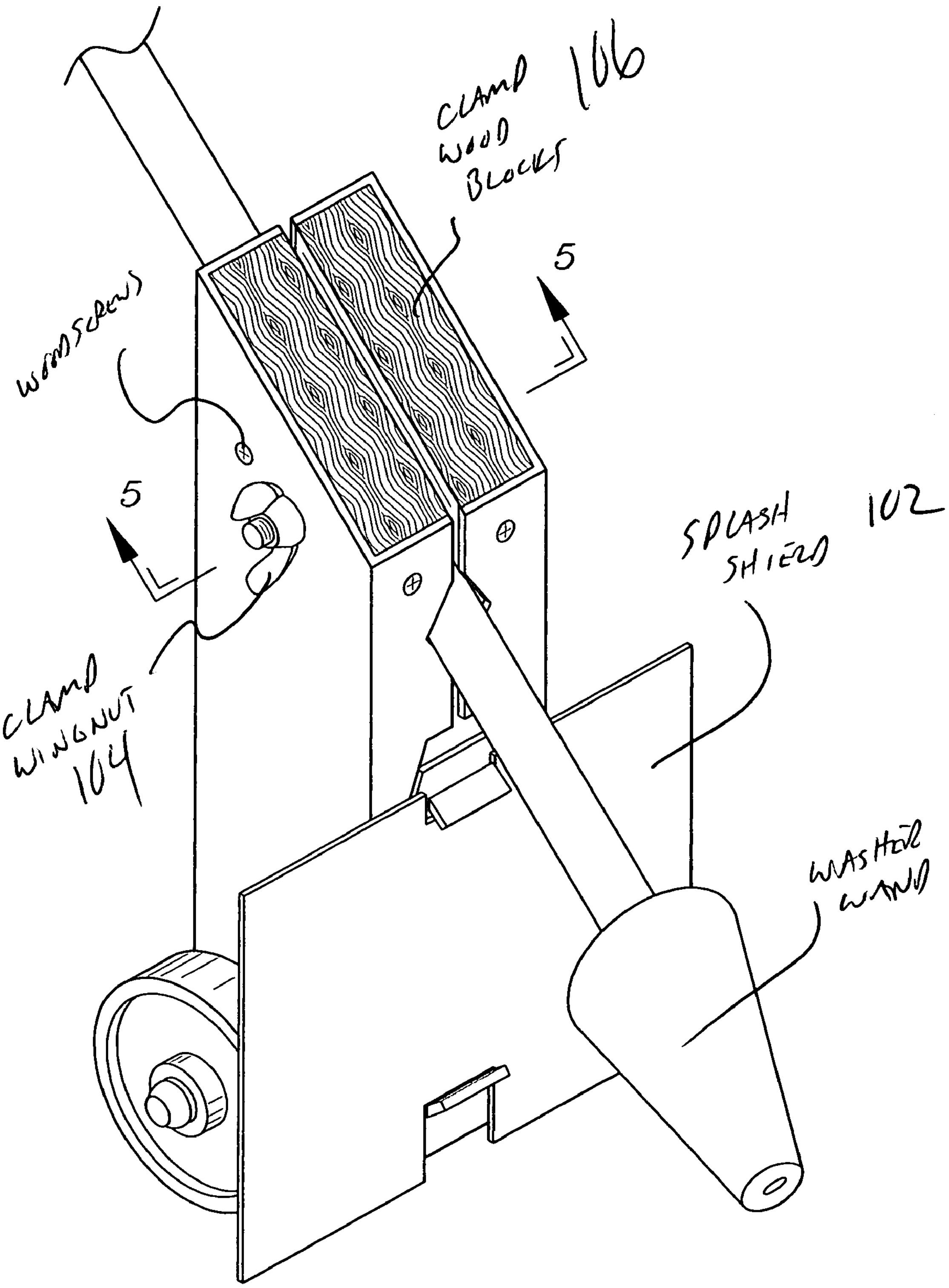
FIG. 1 illustrates a perspective view of the mobile pressure washing wand support device.

FIG. 1 illustrates a perspective view of the mobile pressure washing wand support device. In this view, the pressure wand has been secured into the support device. The support device has a splash shield secured by splash shield tabs on the support (depicted in connection with FIG. 3). The wand is secured into the support device within a diamond shaped groove and by a carriage bolt and wingnut (shown in connection with FIG. 5). The support device is mobile since it has two wheels connected via a wheel axle and axle nuts (shown in connection with FIG. 4)

In one embodiment, the base of the support device is manufactured with two inch PVC pipe.

Figure 2:
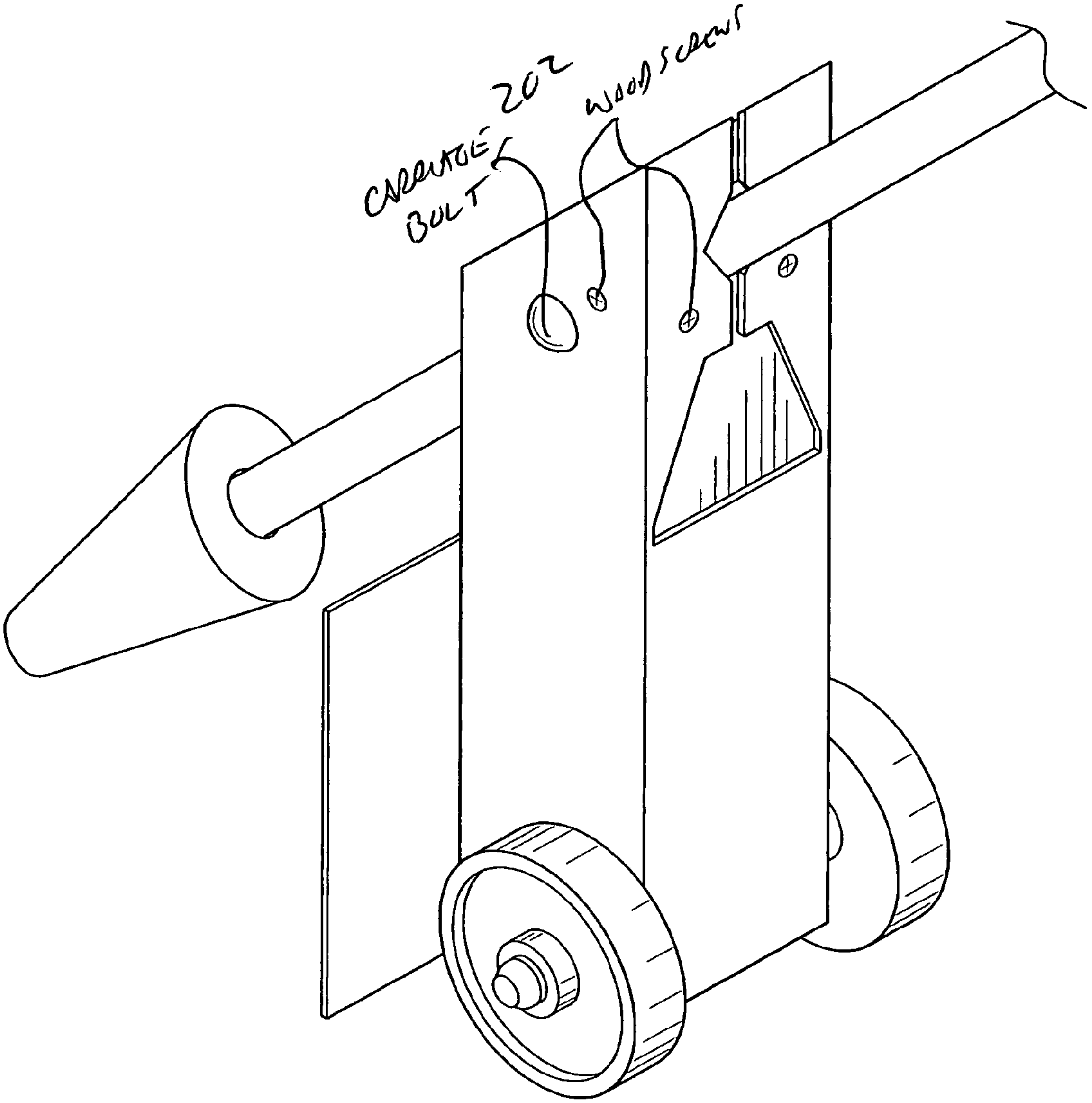
FIG. 2 illustrates a perspective rear view of the mobile pressure washing wand support device of FIG. 1.

FIG. 2 illustrates a perspective rear view of the mobile pressure washing wand support device of FIG. 1. This view depicts the wand being secured to the support device. As previously described, the wand is secured into the support device within a diamond shaped groove and by a carriage bolt and wingnut. A more detailed discussion of the wand being secured to the support device is discussed in connection with FIG. 5.

Figure 3:
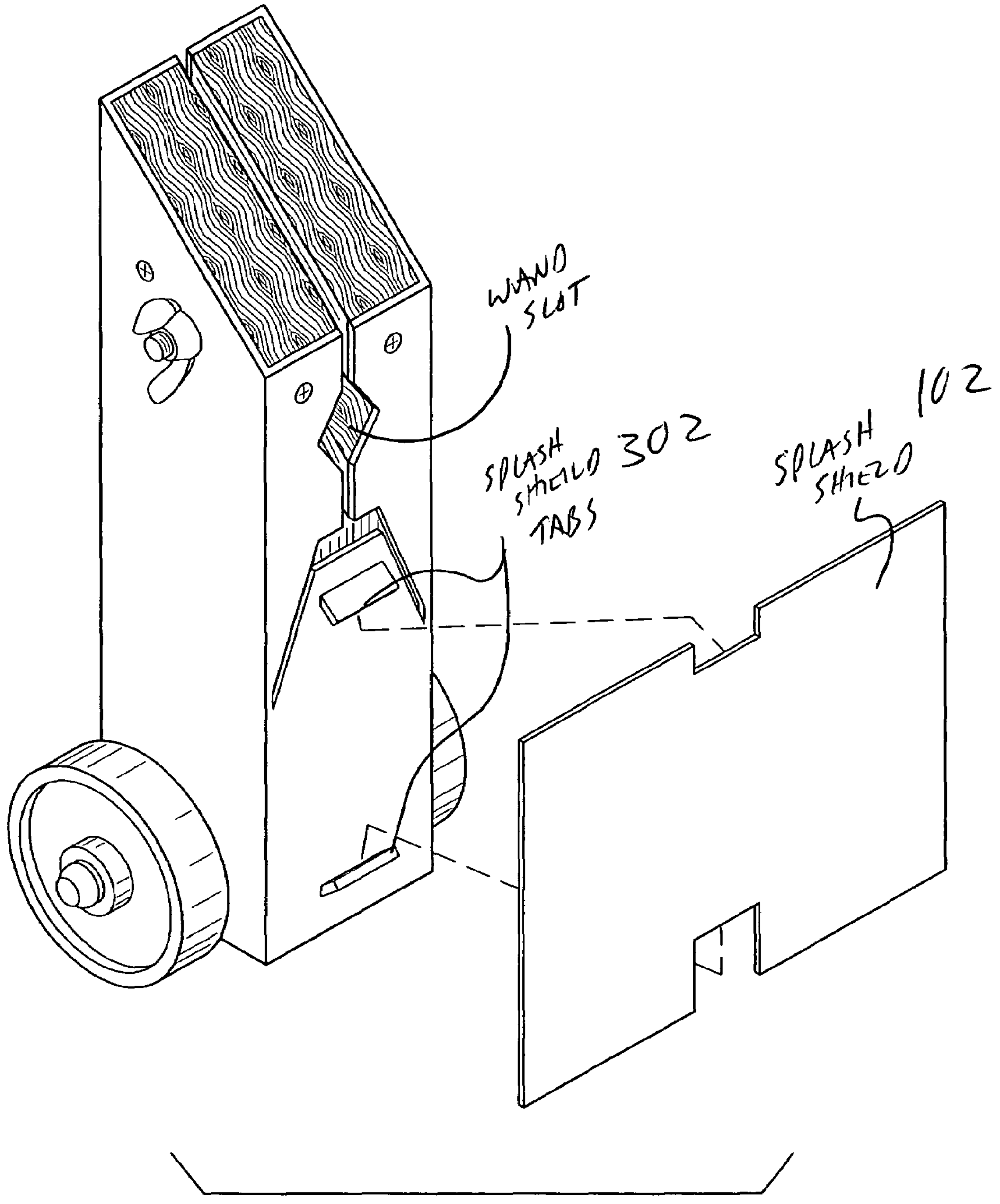
FIG. 3 illustrates an expanded perspective view of the mobile pressure washing wand support device in FIG. 1.

FIG. 3 illustrates an expanded perspective view of the mobile pressure washing wand support device in FIG. 1. This view depicts the removable splash shield and the splash shield tabs on the support tabs. In one embodiment, there are 2 splash shield tabs to secure to the removable splash shield within 2 grooves on the middle top and middle bottom of the splash shield.

Figure 4:
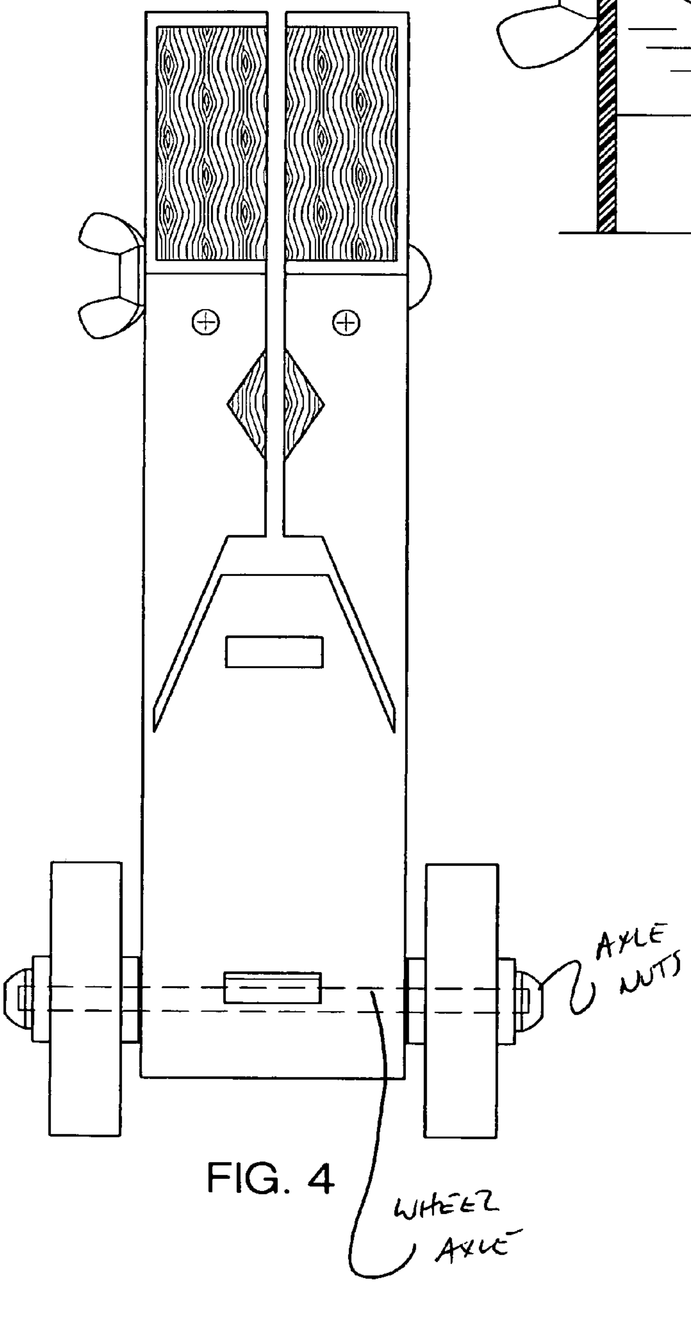
FIG. 4 illustrates a cross-sectional view of the mobile pressure washing wand support device of FIG. 1.

FIG. 4 illustrates a cross-sectional back view of the mobile pressure washing wand support device of FIG. 1. This figure merely shows the two wheels being secured to the support device with a wheel axle and axle nuts.

Figure 5:
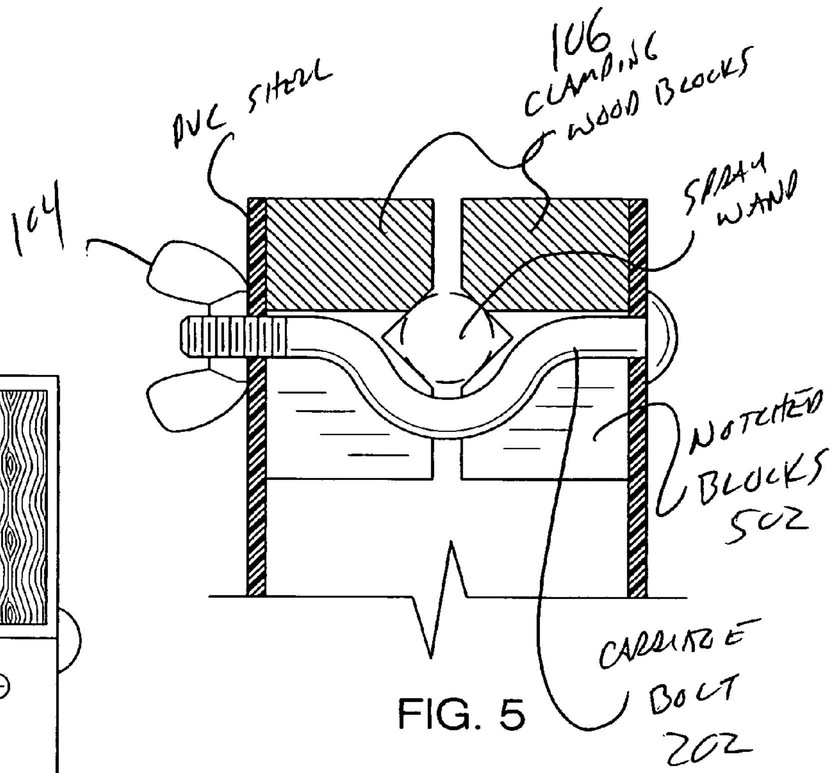
FIG. 5 illustrates a cross-sectional view of the upper half of the mobile pressure washing wand support device of FIG. 1.

FIG. 5 illustrates a cross-sectional view of the upper half of the mobile pressure washing wand support device of FIG. 1. This figure shows the wand being secured to the support device within a diamond shaped groove. The wand is supported from below by the carriage bolt, wingnut, and notched blocks. The wand is secured from above by the clamping wood blocks.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus for a mobile support device for a pressure washer wand comprising:

the mobile support device with a removable splash shield to be secured with a plurality of splash shield tabs on the support device and grooves on the splash shield;

the mobile support device with an insert to secure the pressure washer wand, the insert of a substantially diamond shaped groove, the pressure wand secured from below by a carriage bolt, wingnut, and a notched block on each side, the pressure wand is secured from above by a clamping wood block on each side; and the mobile support device with wheels secured by a wheel axle.

* * * * *